(12) United States Patent
Luce

(10) Patent No.: US 9,321,525 B2
(45) Date of Patent: Apr. 26, 2016

(54) SHRINK STRUT LANDING GEAR SYSTEM, METHOD, AND APPARATUS

(71) Applicant: GOODRICH CORPORATION, Charlotte, NC (US)

(72) Inventor: William E. Luce, Colleyville, TX (US)

(73) Assignee: Goodrich Corporation, Charlotte, NC (US)

( * ) Notice: Subject to any disclaimer, the term of this patent is extended or adjusted under 35 U.S.C. 154(b) by 351 days.

(21) Appl. No.: 14/052,257

(22) Filed: Oct. 11, 2013

(65) Prior Publication Data

US 2015/0101480 A1    Apr. 16, 2015

(51) Int. Cl.
| | |
|---|---|
| *B64C 25/18* | (2006.01) |
| *B64C 25/22* | (2006.01) |
| *B64C 25/60* | (2006.01) |
| *F16F 9/56* | (2006.01) |
| *B64C 25/28* | (2006.01) |
| *B64C 25/00* | (2006.01) |

(52) U.S. Cl.
CPC .................. *B64C 25/18* (2013.01); *B64C 25/22* (2013.01); *B64C 25/28* (2013.01); *B64C 25/60* (2013.01); *F16F 9/56* (2013.01); *B64C 2025/008* (2013.01)

(58) Field of Classification Search
CPC ........... F16F 5/00; B64C 25/10; B64C 25/22; B64C 25/18; B64C 25/60
USPC ........................................................... 60/474
See application file for complete search history.

(56) References Cited

U.S. PATENT DOCUMENTS 6,120,009 A * 9/2000 Gatehouse .............. B64C 25/60
267/64.11

FOREIGN PATENT DOCUMENTS

| EP | 2505499 | 10/2012 | |
|---|---|---|---|
| FR | 800051 | 6/1936 | |
| FR | 800051 A * | 6/1936 | .............. B64C 25/22 |

OTHER PUBLICATIONS

Extended European Search Report dated Mar. 4, 2015 in European Application No. 14187892.6.

* cited by examiner

*Primary Examiner* — Thomas E Lazo
(74) *Attorney, Agent, or Firm* — Snell & Wilmer L.L.P.

(57) ABSTRACT

The landing gear systems, methods and apparatuses disclosed herein may comprise a shrink pump and an unshrink valve that are capable of shrinking a landing gear shock strut up to about 40% of its available stroke. The shrink pump may be configured to pump fluid (e.g., a hydraulic fluid) between an oil chamber, where hydraulic fluid is likely present and a shrink chamber to shrink the landing gear. Moreover, the shrink pump and unshrink valve may be part of a strut shrink system.

15 Claims, 5 Drawing Sheets

SHRINK STRUT LANDING GEAR SYSTEM, METHOD, AND APPARATUS

FIELD

The present disclosure relates to landing gear and, more specifically, to a shrinkable landing gear system.

BACKGROUND

Retractable aircraft landing gear are typically stowed in the aircraft structure and are deployed during takeoff and landing events. The envelope for storing the landing gear in the stowed position may not be lame enough to accommodate the length of the landing gear.

SUMMARY

In various embodiments, a shock strut may comprise a strut piston, a strut cylinder, an upper strut bearing, a lower strut bearing, a shrink chamber, and a strut shrink system. The strut piston may define an oil chamber and may comprise an exterior wall. The strut cylinder may be configured to at least partially receive the strut piston and may comprise an interior wall. The upper strut bearing may be disposed on an end of the strut piston. The upper strut bearing may be configured to guide the strut piston within the strut cylinder. The lower strut bearing may be disposed on a portion of the strut cylinder. The lower strut bearing may also be configured to guide the strut piston within the strut cylinder. The shrink chamber may be defined by the upper strut bearing, the interior wall, the exterior wall and the lower strut bearing. The shrink chamber may be in fluid communication with the oil chamber. The strut shrink system configured to conduct a fluid between the shrink chamber and the oil chamber. The strut shrink system may comprise a shrink pump configured to pump the fluid from the oil chamber into the shrink chamber.

In various embodiments, a shrinkable aircraft landing system may comprise a shock strut, a strut shrink system and an oil chamber. The shock strut may comprise a shock cylinder and a shock piston. The shock cylinder and the shock piston may at least partially define a shrink chamber. The strut shrink system may comprise a shrink pump, and a first valve. The oil chamber may be defined within at least one of the shock cylinder and the shock piston. The oil chamber may be in fluid communication with the shrink chamber via the strut shrink system. Fluid may be pumped from the oil chamber into the shrink chamber by the shrink pump in response to the strut shrink system receiving a first command to retract, or more specifically to shrink. Fluid may be allowed to migrate through the first valve from the shrink chamber to the oil chamber in response to the strut shrink system receiving a second command to deploy, extend, or unshrink.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical, chemical and mechanical changes may be made without departing from the spirit and scope of the disclosure. Thus, the detailed description herein is presented for purposes of illustration only and not of limitation, For example, the steps recited in any of the method or process descriptions may be executed in any order and are not necessarily limited to the order presented.

As used herein, phrases such as "make contact with," "coupled to," "touch," "interface with" and "engage" may be used interchangeably. Different cross-hatching may be used throughout the figures to denote different parts but not necessarily to denote the same or different materials.

Figure 1:
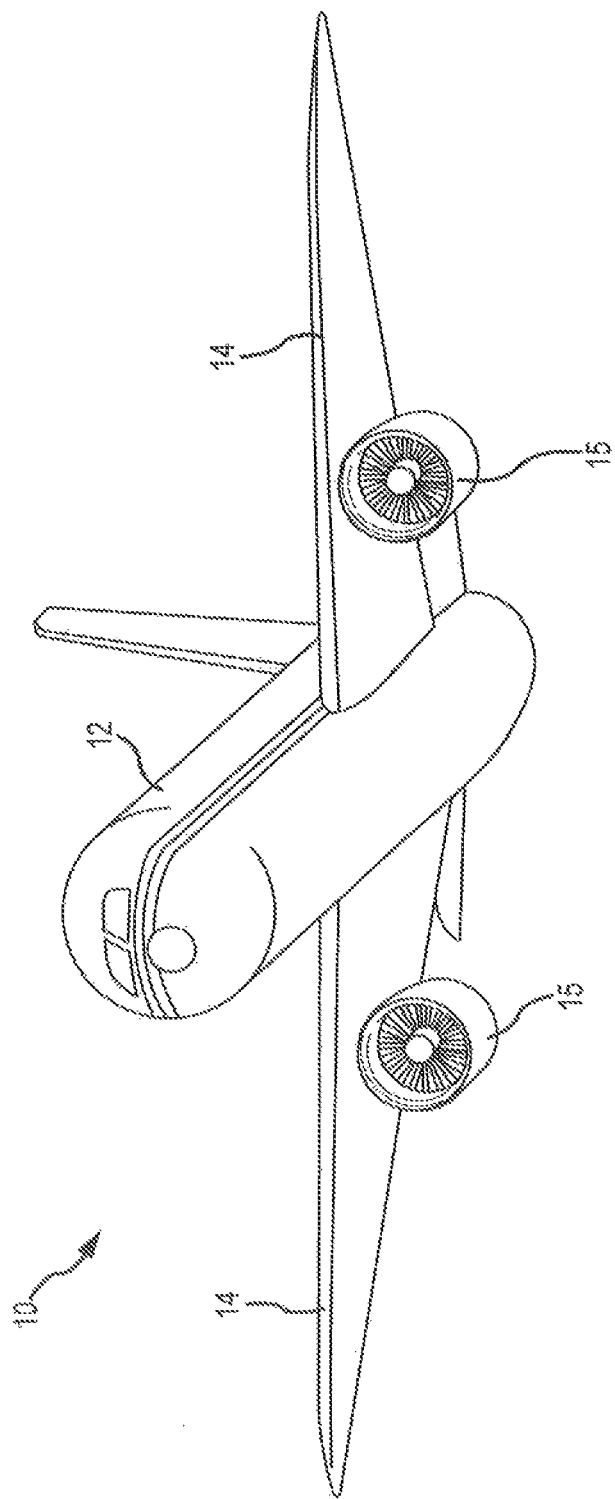
FIG. 1 illustrates a perspective view of an aircraft in accordance with various embodiments.

In various embodiments and with reference to FIG. 1, an aircraft 10 may comprise a fuselage 12. Fuselage 12 may be coupled to and/or comprise a pair of wings 14. One or more engines 15 may be coupled to the underside of wings 14. Aircraft 10 may also comprise deployable and/or retractable landing gear. The landing gear may also be shrinkable. The landing gear may be configured to extend to a deployed height (e.g., prior to landing) and shrink to a stowed height (e.g., after takeoff). The landing gear maybe shrinkable to accommodate the storage envelope of an aircraft when the landing gear is stowed. In this regard, the landing gear may be capable of shrinking up to 40% of the total available shock strut stroke and maybe more depending on the air spring configuration.

Figure 2:
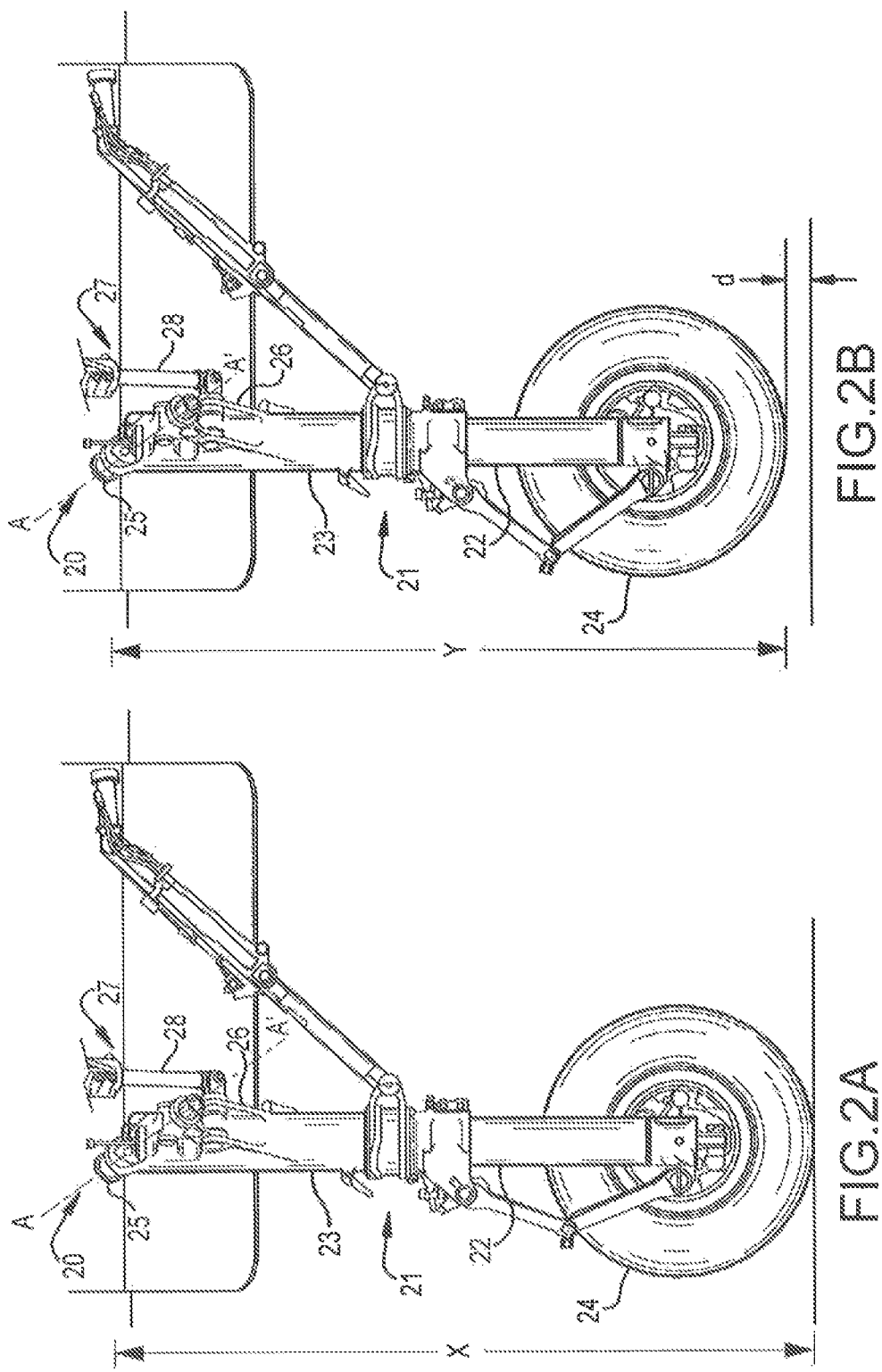
FIG. 2A illustrates a side view of a landing gear in a first position in accordance with various embodiments.
FIG. 2B illustrates a side view of a landing gear in a second position in accordance with various embodiments.

In various embodiments and with reference to FIGS. 1, and 2A-2B, show an aircraft landing gear 20, including a strut 21. Landing gear 20 may be configured to attach to the structure of aircraft 10. Landing gear 20 may be moveable between a deployed position and a retracted position. In the retracted position, landing gear 20 may be housed within fuselage 12 of aircraft 10. Landing gear 20 may be adapted for use on any vehicle, aircraft, and/or helicopter. Landing gear 20 may also be used in body mounted and/or nose mounted landing gear systems. Additionally, the landing gear 20 may be included in laterally retracting as well as forward and aft retracting landing gear systems.

In various embodiments, the landing gear 20 may be shrinkable and is shown in a deployed but shortened or "shrunk" position in FIG. 2B. In this position, strut 21 has been shortened in length by a distance "d." in this regard, the length of strut 21 may be shortened and/or shrunk by up to 40% of the total available shock strut 21 stroke and maybe more depending on the air spring configuration. More specifically, landing gear 20 may be a first length X in an extended condition as shown in FIG. 2A. In response to a command to retract, the strut piston 22 may be retracted into the strut cylinder 23 shrinking the length of the landing gear to a second length Y. In this regard, the difference between the first length X and the second length Y may be d.

In various embodiments and with reference to FIGS. 2A-2B, landing gear 20 may comprise a strut 21. Strut 21 may be a hydraulic strut, a pneumatic strut, and/or a hydraulic-pneumatic strut. Strut 21 may comprise a strut piston 22. Strut piston 22 may have an upper portion that is telescoped inside an open end of a strut cylinder 23. A wheel 24 may be rotatably mounted to a lower portion of strut piston 22. A trunnion shaft 25 may be attached to an upper end portion of strut 21. Each end of trunnion shaft 25 may include a shaft journal that is rotatably mounted in a bushing attached to the structure of an aircraft. Landing gear 20 may pivot about the axis A-A' of trunnion shaft 25 to retract following takeoff and pivots in the opposite manner to deploy before landing the aircraft.

In various embodiments, trunnion clevis 26 may extend from the outer diameter of strut cylinder 23. In this regard, trunnion clevis 26 may provide an attachment point for landing gear actuator 27. Landing gear actuator 27 may be coupled to trunnion clevis 26 via actuator piston rod 28. Landing gear actuator 27 may also be coupled to the structure of the aircraft. Hydraulic fluid may be provided by an aircraft hydraulic system to landing gear actuator 27 to deploy and/or retract landing gear 20.

In various embodiments, landing gear actuator 27 may compress to move landing gear 20 from a deployed position to a stowed or retracted position. In this regard, landing gear 20 is rotated about axis A-A' of trunnion shaft 25 to the stowed position. Before or during retraction of landing gear 20, strut piston 22 may be driven (by, for example, a shrink strut system 40, as shown in FIG. 3) into the strut cylinder 23 the distance "d" before the landing guar 20 is fully retracted into the aircraft fuselage.

In various embodiments, landing gear actuator 27 may extend to move landing gear 20 from a stowed or retracted position to a deployed position. In this regard, landing gear 20 may be rotated about axis A-A' of trunnion shaft 25 to a deployed position. As landing gear 20 deploys, strut piston 22 may remain withdrawn within strut cylinder 23 (e.g., until landing gear 20 clears the aircraft structure), In response to landing gear 20 clearing the aircraft structure, strut piston 22 may be driven to extend the strut 21 to its fully extended length.

Figure 3:
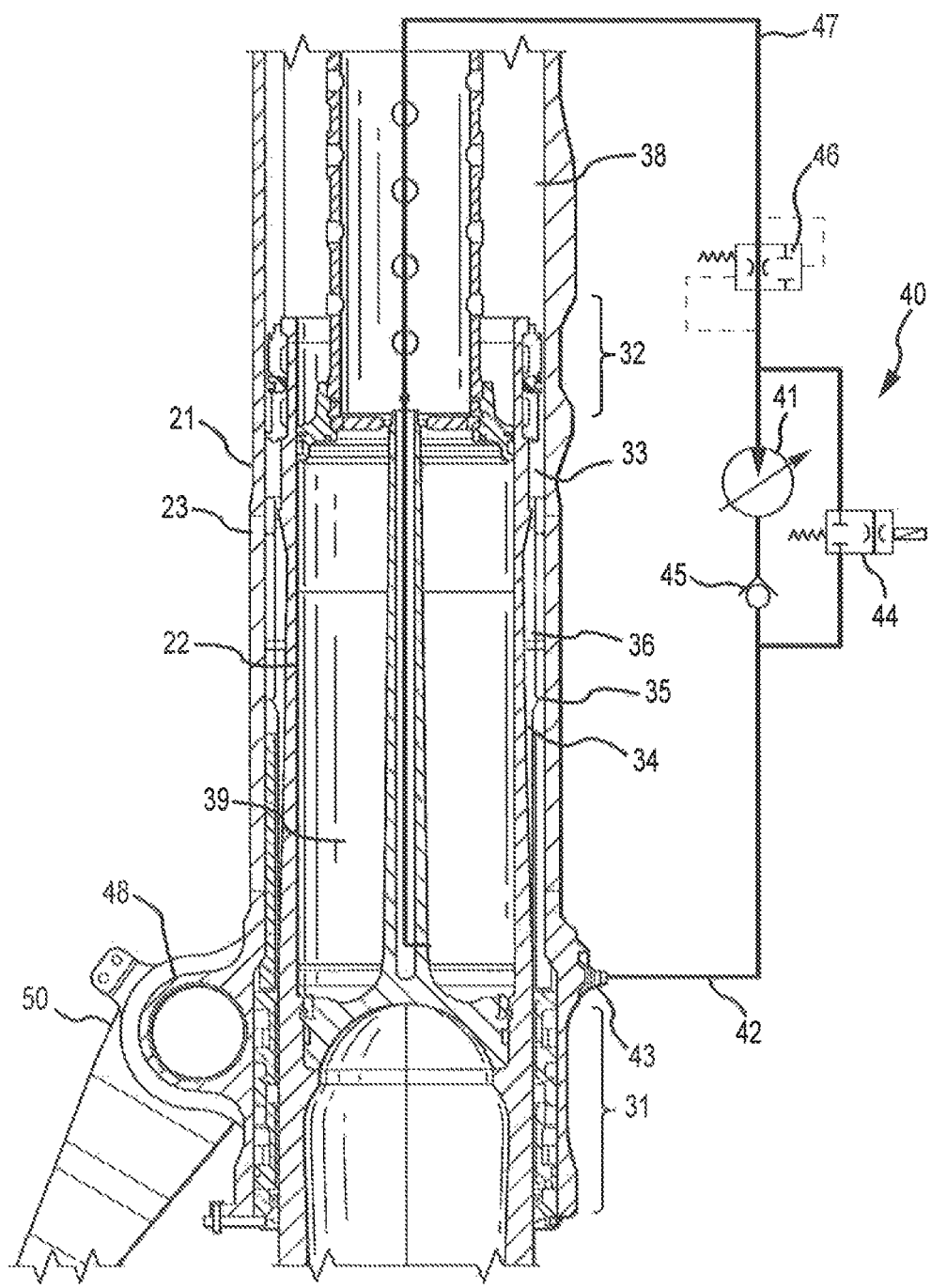
FIG. 3 illustrates a cross-section of a portion of a landing gear strut in accordance with various embodiments.

In various embodiments and with reference to FIG. 3, strut 21 is shown in an extended position and/or deployed condition (e.g., in an after takeoff but prior to retraction or landing condition). Strut piston 22 may be reciprocally received within strut cylinder 23. Strut piston 22 and strut cylinder 23 may have a concentric relationship. A lower strut bearing 31 may be received within the open end of the strut cylinder 23 against which the strut piston 22 slides. An upper strut bearing 32 may be attached to the end portion of the strut piston 22 within the strut cylinder 23. In this regard, lower strut bearing 31 and upper strut bearing 32 may be support, align, and facilitate the motion of strut piston 22 relative to strut cylinder 23.

In various embodiments, strut 21 may comprise a valve 33 that may be adjacent to upper strut bearing 32. Valve 33 is configured to control fluid flow between a shrink chamber 36 and oil chamber 38. Valve 33 may be a recoil valve. Valve 33 may be configured to allow recoil fluid to flow more easily from oil chamber 38 into shrink chamber 36 as compared to flowing from shrink chamber 36 back into oil chamber 38. This configuration of valve 33 may be used to reduce the number of oscillations that may occur when strut 21 is compressed and decompressed upon application of a load (e.g., during a landing event). Further details regards valve 33 may be found in U.S. patent application Ser. No. 13/078,075, filed on Apr. 1, 2011 and entitled, Landing Gear System, which is hereby incorporated by reference in its entirety for all purposes.

In various embodiments, shrink chamber 36 may be formed between the upper strut bearing 32, the strut cylinder 23, the strut piston 22, and the lower strut bearing 31. More specifically, shrink chamber 36 may be defined by an exterior wall 34 of strut piston 22, an interior wall 35 of strut cylinder 23, upper strut hearing 32 and lower strut bearing 31. Shrink chamber 36 and may be filled with hydraulic fluid in a shrunk configuration and may contain minimal hydraulic fluid in an extended configuration.

In various embodiments, shrink chamber 36 may be in fluid communication with any portion of the strut 21 where hydraulic fluid is present. More specifically, shrink chamber 36 may be in fluid communication with oil chamber 38 and/or dynamic oil chamber 39 via a strut shrink system 40. Strut shrink system 40 may be configured to pump and/or transfer hydraulic fluid between shrink chamber 36 and oil chamber 38 and/or dynamic oil chamber 39 to shrink or extend strut 21 based on an operating condition (e.g., a takeoff event, a landing event, a command to retract the landing gear, a command to deploy the landing gear, and/or the like). Strut 21 may further comprise and/or be configured with a sensor 48. Sensor 48 may be any suitable sensor capable of detecting a load and/or a displacement between strut piston 22 and strut cylinder 23.

in various embodiments, strut shrink system 40 may be isolated or self-contained, in this regard, the strut shrink system may not be connected to other aircraft hydraulic system. This isolation allows maintenance personnel to easily detect leaks and insures that the loss in hydraulic pressure in one aircraft system does not result in a loss of hydraulic pressure in another aircraft system.

In various embodiments and with continued reference to FIG. 3, strut shrink system 40 may comprise a shrink pump 41, an unshrink valve 44, and/or an over pressure valve 46. Strut shrink system 40 may also comprise one or more check valves 45. Shrink pump 41 may be in fluid communication with shrink chamber 36 at a port 43 and via a pipe or duct 42. Shrink pump 41 may also be in fluid communication with oil chamber 38 and/or dynamic oil chamber 39 via a pipe or duct 47. In this regards, shrink pump 41 may be configured to move, pump, and/or transfer hydraulic fluid between shrink chamber 36 and oil chamber 38 and/or dynamic oil chamber 39. In response to a command to shrink, shrink pump 41 may pump fluid from oil chamber 38 and/or dynamic oil chamber 39 in shrink chamber 36. As fluid is pumped into shrink chamber 36, shrink chamber 36 expands from an un-shrunk configuration to a shrunk configuration, causing strut piston 22 to retract into strut cylinder 23 a distance d, as shown in FIG. 2B. The shrink pump 41 may also be in fluid communication with unshrink valve 44 and/or over pressure valve 46.

In various embodiments, check valve 45 may be installed in-line with shrink pump 41 and in parallel to unshrink valve 44. Check valve 45 may be plumed up-stream and/or down-stream of shrink pump 41 and in parallel with unshrink valve 44. Check valve 45 may prevent fluid from migrating and/or leaking from shrink chamber 36 to oil chamber 38 and/or dynamic oil chamber 39 when shrink pump 41 is not operating. In this regard, pressure inside strut 21 (acting on the entire inner chamber defined by the strut cylinder 23 and strut piston 22) would drive fluid out of shrink chamber 36 and back into oil chamber 38 and/or dynamic oil chamber 39 causing strut 21 to extend. Moreover, check valve 45 may not inhibit and/or prohibit flow through unshrink valve 44.

In various embodiments, unshrink valve 44 may be any suitable two position valve. For example, unshrink valve 44 may be a spring bias valve with a solenoid command, as shown in FIG. 3. Unshrink valve 44 may also be a double detent valve with double solenoid command. In response to an open command, unshrink valve 44 may open, allowing fluid to pass from shrink chamber 36 to oil chamber 38 and/or dynamic oil chamber 39. In this regard, the fluid in shrink chamber 36 would be forced back into oil chamber 38 and/or dynamic oil chamber 39 by the pressure inside strut 21 as discussed herein. During a shrink operation, unshrink valve 44 may be in a closed position. More specifically, unshrink valve 44 may be in the closed and/or blocked position during a shrink operation so that the pressure being generated by shrink pump 41 does not escape shrink chamber 36 through unshrink valve 44.

In various embodiments, over pressure valve 46 may be used where fluid to shrink strut 21 is taken from dynamic oil chamber 39 (e.g., oil moves in and out of oil chamber 38 as strut 21 cycles or is loaded). Over pressure valve 46 may be configured to protect and/or isolate shrink chamber 36 from dynamic oil chamber 39. Over pressure valve 46 may be a pressure regulating valve, a two position valve, and/or any other suitable valve. In this regard, over pressure valve 46 may be commanded closed when strut 21 is in an extended configuration to isolate shrink chamber 36 from fluid moving in and/or out of dynamic oil chamber 39.

Figure 4:
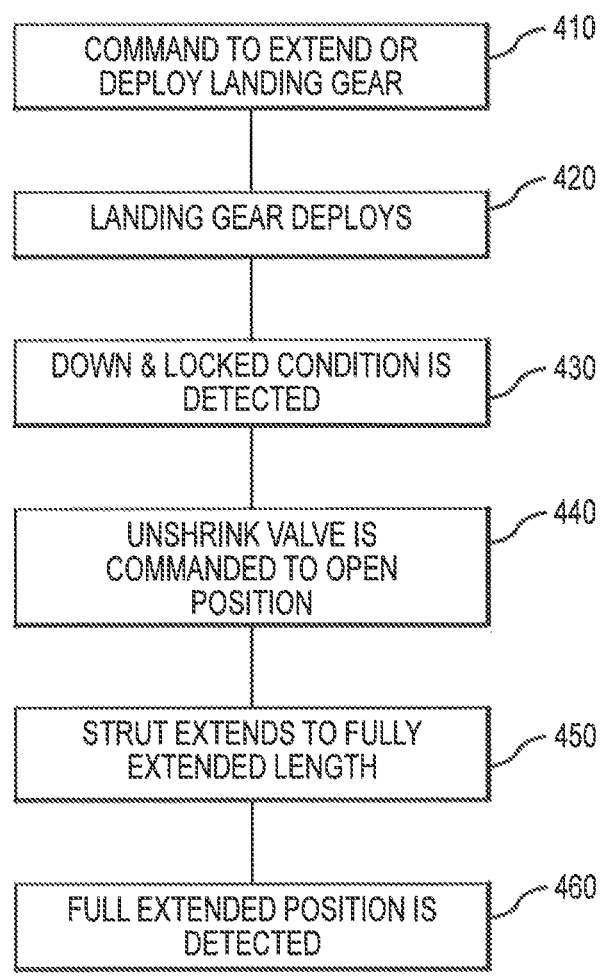
FIG. 4 is a process flow for deploying a shrinkable landing gear in accordance with various embodiments.

In various embodiments, and with reference to FIGS. 3 and 4, an aircraft may receive a command to extend or deploy the landing gear from a pilot flying the aircraft (Step 410). The landing gear may be deployed and/or rotated beyond the aircraft structure (Step 420). A landing gear system and/or controller may monitor the landing gear to detect a down and locked condition of the landing gear (Step 430). In response to the down and locked condition being detected, unshrink valve 44 may open (Step 440). In this regard, fluid may be allowed to move out of and/or migrate from shrink chamber 36 into oil chamber 38 and/or dynamic oil chamber 39. In response to the fluid migrating from shrink chamber 36, the strut may extend to its fully deployed length (Step 450). An aircraft controller and/or instrument may detect the fully deployed length and/or condition (Step 460). In this regard, an aircraft controller may be in electronic communication with sensor 48 and may be configured to receive information indicative of a deployed condition (e.g., a relative displacement between strut piston 22 and strut cylinder 23, a volume of fluid transferred from shrink chamber 36 to oil chamber 38, rotation of torque arm joint 50, and/or the like).

Figure 5:
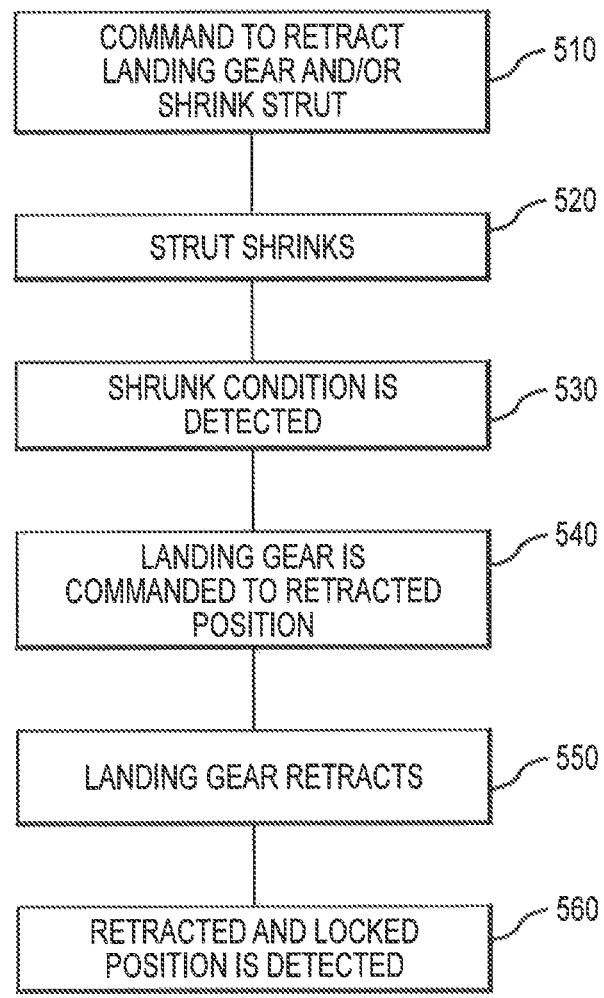
FIG. 5 is a process flow for retracting a shrinkable landing gear in accordance with various embodiments.

In various embodiments, and with reference to FIGS. 3 and 5, an aircraft may receive a command to retract the landing gear and/or shrink strut 21 from a pilot flying the aircraft (Step 510). In response to the command, shrink pump 41 may pump fluid from oil chamber 38 and/or dynamic oil chamber 39 into shrink chamber 36. The fluid may create a pressure in shrink chamber 36 causing strut piston 22 to retract into strut cylinder 23, shrinking strut 21 (Step 520). An aircraft controller may be configured to detect the shrunk condition of strut 21 (Step 530). in this regard, the aircraft controller may monitor sensor 48 to determine whether sufficient retraction of stmt piston 22 has occurred. For example, sensor 48 may monitor rotation at torque arm joint 50. Sensor 48 may also be configured to monitor and/or determine the displacement of strut piston 22 relative to strut cylinder 23 and/or the volume of fluid transferred between oil chamber 38 and shrink chamber 36. The aircraft controller may also be configured to pump a specified volume of fluid from oil chamber 38 and/or dynamic oil chamber 39 into shrink chamber 36. In response to the detected condition indicating that the landing gear is in a shrunk configuration, the landing gear may be commanded to the retracted position (Step 540). In response to the command to retract, the landing gear may retract into the aircraft structure (e.g., to the stowed position) (Step 550). The landing gear system and/or an aircraft controller may detect the retracted and/or locked condition of the landing gear (Step 560).

Any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more."

Moreover, where a phrase similar to "at least one of A, B, car C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment for example, A and B, A and C, B and C, or A and B and C. Different cross-hatching and/or surface shading is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A shock strut, comprising:
    a strut piston defining an oil chamber and comprising an exterior wall;
    a strut cylinder configured to at least partially receive the strut piston and comprising an interior wall;
    an upper strut bearing disposed on an end of the strut piston and configured to guide the strut piston within the strut cylinder;
    a lower strut bearing disposed on a portion of the strut piston and configured to guide the strut piston within the strut cylinder;
    a shrink chamber defined by the upper strut bearing, the interior wall, the exterior wall and the lower strut bearing, the shrink chamber in fluid communication with the oil chamber; and
    a strut shrink system configured to conduct a fluid between the shrink chamber and the oil chamber, the strut shrink system comprising a shrink pump in parallel with a valve and in-line with a check valve, the shrink pump configured to pump the fluid from the oil chamber into the shrink chamber.

2. The shock strut of claim 1, wherein the strut shrink system is configured to shrink the shock strut from a first length to a second length in response to receiving a command to retract a landing gear.

3. The shock strut of claim 2, wherein the shrinkage between the first length and the second length is up to 40% of the total available shock strut stroke and maybe more depending on an air spring configuration.

4. The shock strut of claim 1, wherein the valve is in parallel with the check valve.

5. The shock strut of claim 4, wherein the check valve is configured to prevent fluid migration from the shrink chamber.

6. The shock strut of claim 1, wherein the valve is configured to allow release of the pressure trapped in the shrink chamber in response to a command to unshrink.

7. The shock strut of claim 1, further comprising an over pressure valve configured to manage fluid pressure in the shrink chamber in response to the shock strut oscillating.

8. The shock strut of claim 1, further comprising a sensor capable of detecting at least one of an amount of fluid in the shrink chamber and a change from a first length to a second length.

9. The shock strut of claim 1, wherein the shock strut is a portion of a landing gear that is installable on an aircraft.

10. A shrinkable aircraft landing system, comprising:
    a shock strut comprising a shock cylinder and a shock piston, the shock cylinder and the shock piston at least partially defining a shrink chamber; and
    a strut shrink system comprising a shrink pump, and a first valve; an oil chamber defined within at least one of the shock cylinder and the shock piston, the oil chamber in fluid communication with the shrink chamber via the strut shrink system, wherein fluid is pumped from the oil chamber into the shrink chamber by the shrink pump in response to the strut shrink system receiving a first command to stow a landing gear, and
    wherein the fluid migrates through the first valve from the shrink chamber to the oil chamber in response to the strut shrink system receiving a second command to deploy the landing gear.

11. The shrinkable aircraft landing system of claim 10, wherein the first valve is a position valve, and wherein the second command causes the first valve to open.

12. The shrinkable aircraft landing system of claim 10, further comprising a check valve in-line with the shrink pump.

13. The shrinkable aircraft landing system of claim 12, wherein the check valve is configured to reduce fluid migration from the shrink chamber in response to the shrink pump being off.

14. The shrinkable aircraft landing system of claim 12, wherein the strut shrink system further comprises a second valve.

15. The shrinkable aircraft landing system of claim 14, wherein the second valve is an over pressure valve that is configured to manage the pressure exerted on the shrink chamber by the oil chamber.

* * * * *